United States Patent [19]

Priessnitz

[11] Patent Number: 4,930,957
[45] Date of Patent: Jun. 5, 1990

[54] CENTERING SYSTEM FOR ROTARY MACHINE ELEMENTS, PARTICULARLY BORING, MILLING, REAMING TOOLS AND THE LIKE

[75] Inventor: Alfred Priessnitz, Esslingen, Fed. Rep. of Germany

[73] Assignee: Eberhard Bauer GmbH & Co., Neckar, Fed. Rep. of Germany

[21] Appl. No.: 388,997

[22] Filed: Aug. 3, 1989

[30] Foreign Application Priority Data

Jul. 19, 1988 [DE] Fed. Rep. of Germany ....... 3824462

[51] Int. Cl.⁵ ............................................. B23B 31/08
[52] U.S. Cl. .................................... 409/234; 408/153; 408/156; 408/181
[58] Field of Search ............... 408/150, 151, 153, 154, 408/156, 180, 181; 409/234

[56] References Cited

U.S. PATENT DOCUMENTS

| 2,960,013 | 11/1960 | Novkov | 408/150 |
| 4,351,207 | 9/1982 | Werth, Jr. | 408/156 |
| 4,776,734 | 10/1988 | Buettiker et al. | 408/181 |

FOREIGN PATENT DOCUMENTS

| 058646 | 8/1982 | European Pat. Off. . |
| 251405 | 1/1988 | European Pat. Off. . |
| 2228553 | 1/1974 | Fed. Rep. of Germany . |
| 2835712 | 2/1980 | Fed. Rep. of Germany . |
| 3029133 | 8/1981 | Fed. Rep. of Germany . |
| 3446275 | 7/1986 | Fed. Rep. of Germany . |
| 3636581 | 5/1988 | Fed. Rep. of Germany . |
| 2534682 | 4/1984 | France . |
| 8001364 | 7/1980 | PCT Int'l Appl. | 408/156 |

*Primary Examiner*—Daniel Howell
*Attorney, Agent, or Firm*—Frishauf, Holtz, Goodman & Woodward

[57] ABSTRACT

To center a tool restrained within a collet coupled to a driven portion (9) which, in turn, is coupled to a driving portion (2), and to compensate for possible axial offsets of the respective portions, a coupling element connects the driving and driven portions and two first spring elements (23, 24) are located on the driving portion, two further spring elements (31, 32) are located on the driving portions offset with respect to the first spring elements of 90 degrees. Each one of the spring elements can be adjusted with respect to a centrally located counter support portion (29, 31) by adjustment screws passing through the spring elements and bearing against the counter support, to thereby position the axis of the driven portion (9) carrying the collet, in congruence with the axis of the driving portion (2) even if there are manufacturing tolerances or other offset conditions, such as tolerances in the tool clamped in the collet.

20 Claims, 2 Drawing Sheets

CENTERING SYSTEM FOR ROTARY MACHINE ELEMENTS, PARTICULARLY BORING, MILLING, REAMING TOOLS AND THE LIKE

The present invention relates to a centering system to center a removable machine tool element, such as a boring tool, drill, reamer, milling tool or the like with respect to a driven spindle and to compensate for axial misalignments of the tool and the driving element.

BACKGROUND

Removable tools are often carried in collets or chucks coupled to rotary machine tools, or driving spindles thereof by floating holders which permit compensation for misalignments between the machine spindle, to which, for example, the tool is secured and a hole into which it is to enter. Such floating holders customarily have two slider guides, respectively offset by 90 degrees, to permit compensation between the axis of the drive spindle and the axis of a bore, into which the tool is to enter. Such floating holders are not provided to set an axial offset with respect to a fixed amount, or to compensate for actual offsets and reduce them to a value of 0.

THE INVENTION

It is an object to provide an adjustment system, and specifically a centering system for rotary machine tools which permits compensation for a predetermined axial offset between the axis of coupled elements and to retain the axial offset compensation for a long period of time.

Briefly, a coupling element is provided connecting a driving part, such a driving disc, or the like, to a driven part which is adapted to be coupled to a tool element. Two spring elements are located on one of the parts, for example the driving part and coupled to the other, typically the driven part. Counter support means are then coupled to one of the parts, for example to the driven part, or forming, for example, part of the driven part. Two first adjustable spring position adjustment elements are coupled to the two respective ones of the first spring elements and engaging the counter support means to set the spring position of the respective first spring elements.

In accordance with a feature of the invention, another and similar set of two second spring elements, a second counter support means and two second spring adjustment means are provided, arranged at 90 degrees with respect to the first spring elements, counter support means and position adjustment means, so that compensation for axial offset can be effected based on two mutually perpendicular directions or vectors. The spring elements preferably are flexible in a first plane parallel to the axis of rotation, stiff in a plane perpendicular to the first plane.

The system has the advantage that two, or four, respectively, spring elements are provided in order to couple the driving and the driven components of the system. Complex guide systems, therefore, are not necessary in order to permit the necessary movability of the elements with respect to each other. It is only necessary to provide for deflection of the spring elements and then to set the deflected positions by the adjustable spring position means in order to determine the desired position of the elements with respect to each other. As an additional advantage, the connection of the respective driving and driven elements is free from play. Manufacturing, therefore, is simplified.

DRAWINGS

DETAILED DESCRIPTION

Figure 1:
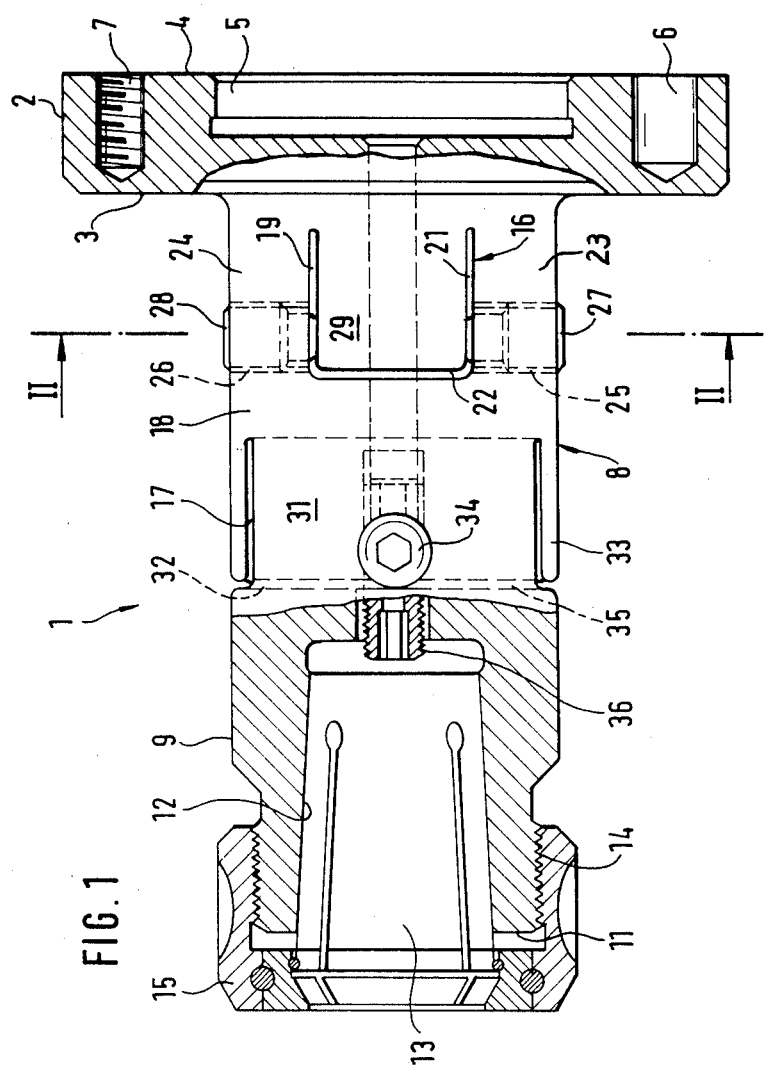
FIG. 1 is an axial side view, partly in section, of the adjustment system.

The invention will be described with reference to a collar-tightening or collet holder for a rotary tool such as a boring tool, a reamer, rotary rasp or the like. FIG. 1 shows the overall system 1, which is adapted for attachment to a machine tool spindle, not shown. The collet holder 1 has an attachment flange 2 at one end thereof, formed with respectively parallel facing sides 3 and 4. The side 4 is ground to a plan configuration and is coaxial with the longitudinal axis of the attachment flange 2, and formed with a cylindrical centering bore 5 therein, to permit attachment of the flange 2 with minimum tolerance on a suitable machine tool head. The flange 2 is further formed with an indexing bore 6 and threaded attachment bores 7, to place the flange 2 in a predetermined position on a machine head and to secure it on the machine head by attachment screws passing into the threaded holes 7.

A unitary, prismatic, or cylindrical shaft 8 is connected to the flange 2. Preferably the shaft 8 is unitary with the flange 2, for example being formed therein. The longitudinal axis of shaft 8 is essentially congruent with the longitudinal axis of the attachment flange 5, and hence with the axis of rotation of a drive spindle to which the flange 2 can be coupled. At the end 9 remote from the flange 2, the shaft 8 is formed with an inwardly constricting tapering bore 12 for a longitudinally slit jaw holder, or collet 13. The jaw, or collet 13 is formed as a compression holder of customary shape. The shaft 8 has a cylindrical outer thread 14 adjacent its remote end to receive a tightening coupling nut 15 which engages the clamping sleeve 13 forming the collet, or jaws, and for tightening the clamping sleeve into the conical opening 12. A tool inserted into the clamping sleeve 13 then will be held as in a collet.

End 9 and the attachment flange 2 form two elements which have axes that can be offset with respect to each other.

In accordance with a feature of the invention, and to permit such adjustment, the cylindrical shaft 8 is formed with two generally U-shaped slits 16 and 17. With respect to the longitudinal axis of the cylindrical shaft 8, they are located at right angles to each other. These two U-formed slits 16 and 17, located in crossing axial planes, have essentially the same shape. They are offset longitudinally with respect to each other, leaving a disc-shaped intermediate element 18 there-between free from the slits 16 and 17.

The U-shaped slit 16 passes through the cylindrical shaft 8 completely from one side to a diametrically positioned opposite side and defines two respectively parallel legs 19 and 21. Legs 19 and 21 extend parallel to the longitudinal axis of the shaft 8. The transversely extending base portion 22 is located in a plane which intersects the longitudinal axis of the shaft 8 at a right angle. The widths of the slits, in the region of the legs 19 and 21, as well as of the base portion 22, can be uniform throughout and is between 1 mm and a maximum of about 2 mm, that is the width of the slits is small with respect to the diameter of the cylindrical shaft 8—see FIG. 1.

The spacing of the two straight legs 19 and 21 is, preferably, about the same as their length, measured in a direction parallel to the longitudinal axis of the shaft 8. It may be, as shown in FIG. 1, roughly about the dimension of the radius of the shaft 8 although the dimension is not critical and will depend largely on the material used for shaft 8 and the use to which the system is to be put.

Figure 2:
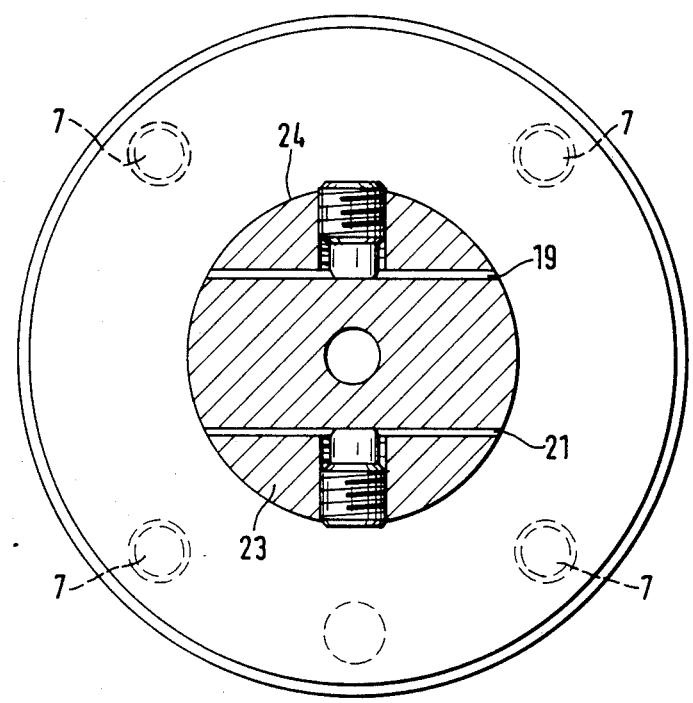
FIG. 2 is a transverse cross sectional view along line 2-II of FIG. 1.

As best seen in FIG. 2, the two legs 19 and 21 of the slit 16 extend clear through the shaft 8 from one side to the other such that the intermediate portion 18 is coupled to the flange 2 or to, in cross section segmentally shaped parts 23, 24, unitary with the flange 2. Due to the material used for the clamping sleeve or collet, the elements 23, 24 can be elastically deflected. Due to their non-rotation symmetrical cross sectional area, they have some slight resiliency in the direction perpendicular to the legs 19 and 21, while exhibiting high rigidity strength in the direction parallel thereto. These portions 23, 24 can deflect somewhat resiliently having the general characteristics of leaf springs. The intermediate element 18, thus, is coupled to the attachment flange 2 via two parallel extending spring elements. The disc-shaped intermediate element 18 and the attachment flange 2 can be moved in a plane parallel to the plane of the drawing of FIG. 1 by comparatively low force; in a direction perpendicular thereto, they are essentially undeflectable, or stiff. Due to the parallel course of the two spring elements 23, 24, an offset parallel to their respective axes of the flange 2 and the shaft 8 is possible.

To permit a predetermined position between the disc-shaped element 18 and the attachment flange to be obtained also in a direction parallel to the plane of the figure, the spring elements can be fixed in predetermined position with respect to the element 8. The spring elements 23, 24 have aligned threaded bores 25, 26 therein (FIG. 1) which extend to the slit 16. Two set screws 27, 28 are located in the respective bores 25, 26, engageable with a counter element 29, forming a counter bearing and positioned inwardly of the slit 16. The counter bearing element 29 is an essentially block-like body which remains when the slits 16 are formed, unitary with flange 2. It is essentially stiff and strong in all directions, so that it can form a counter bearing or a counter abutment for the adjustment screws 27 and 28.

The slit 17 has the same dimensions as the slit 16, and, in all respects, is essentially similar thereto. It is positioned between the disc-shaped intermediate portion 18 and the end 9 which has the conical bore 12 formed therein. It is located at 90 degrees with respect to the slit 16, with respect to the longitudinal axis of the cylindrical shaft 8. Thus, it is cross-positioned as is clearly seen in FIG. 1. Two additional spring elements 31, 32 will there be formed, located at right angles with respect to the spring elements 23, 24. The spring element 32 is not visible in FIG. 1, since it is located at the side opposite the element 31. A counter element 33, as before, extends between the spring elements 31, 32 against which two aligned screws 34 can bear; only one of these screws is visible in the figure. The screws 34, just as the spring 26, 27, are located close to the base portion of the respective slit, that is, close to the base part 22, or 35 respectively. In all respects, the slits 16 and 17 can be identical, except for their position with respect to the circumference of the shaft 8, and longitudinally thereon.

The system is sturdy, and easy to make. The flange 2, with the shaft 8 and the holding collar at end 9 thereon is first made in accordance with standard manufacturing technology; the slits 16 and 17 can be formed in the shaft by an electro erosive machining process, for example using copper electrodes.

USE AND OPERATION

The respective tool to be used is introduced into the collar 12, 13. A depth adjustment screw 36, in the base of the opening 12, can determine the insertion depth of the tool in the clamping system 1. The coupling nut 15 is then tightened, thus clamping the tool in the collar or jaw arrangement. Due to tolerances between the position of the conical bore 12 and the cylindrical centering bore 5, there may be an offset between the axis of the tool clamp in the collar 13 and the axis of the center bore 5. To compensate for this offset, that is to set the axis of the tool clamp in the collar 13 to zero with respect to the axis of the centering bore 5, the system, with the tool therein, is mounted on the machine spindle or a centering jig fitting into the opening 5. The four adjustment screws 27, 28, 34 (and another screw 34 not visible in FIG. 1) are then loosened. By selectively tightening the respective screws adjacent the U-shaped slits 16 and 17, it is then readily possible to set the shaft of the tool clamped in the collar 13 to an offset of 0 with respect to the axis of the shaft entering into the centering hole 5. The respective adjustment screws 27, 28, 34 will engage the counter bearing element 29 and 33, respectively, in order to press the disc-shaped intermediate element 18, or the cylindrical end 9 of the shaft 8 to the opposite side of the longitudinal axis of the tool, in alignment with the respective adjustment screw 27, 28, 34 which is then tightened. After the respective screws have been turned to compensate for any offset of the tool in collar 13 with respect to the center of the axis of rotation of the recess 5, so that the axis of rotation of the flange 2 and that of the tool is set to zero deviation, the respectively opposite adjustment screw 27, 28, 34 of the respective set of screws is tightened against the counter bearing 29. Thus, the respective spring elements are tightened with respect to each other against the counter element, providing for adjustment of the tool in collar 13 in all rotary directions. Laterally occurring forces cannot laterally offset the tool except, of course, for inherent elasticity of the materials of the centering or adjustment system, and the tool respectively.

A suitable material for the flange-shaft combination 8 to which the collar 13 can be secured is any material suitable in the machine tool field, for example steel.

It is not necessary to provide both slits 16, 17. In dependence on the spring elements, positioned parallel to each other and spaced transversely, with respect to the axis of rotation, and with respect to each other, it is possible to provide for adjustment in one plane. If the spring elements are so made that they are deflectable elastically only in a single plane, which includes the longitudinal axis of the one of the elements, whereas the system is effectively stiff with respect to a plane at right angles to that single plane, a parallelogram guidance is obtained, in which the two spring elements can be relatively changed in one plane. Since positioning tolerances can occur in any random direction, it is preferred to use the further set of similar spring elements 32, 33, that is, spring elements similar to elements 23, 24, and positioned 90 degrees rotated with respect to each other, to provide for universal adjustability.

The spring elements of any pair 23, 24 and 32, 33 respectively, are similar to and act like leaf springs; this, necessarily, results in precise parallel offsets of the elements with respect to each other. The counter or abutment element 29, 34 respectively, located between the spring elements, results in a particularly compact overall system.

The permanent adjustment elements, in the simplest form, are the set screws 27, 28, 34, simply screwed into suitable tapped openings in the spring elements themselves.

The structure forming the system can be made easily and simply as a unitary element which couples the flange 2 to the collar portion 9, in which, as desired, one or two slits 16 and 17 are worked, preferably, with respect to the longitudinal axis, passing through diametrically opposite side portions of the intermediate part, to define two legs extending parallel to the longitudinal axis and a base located in a plane transverse to the longitudinal axis. Thus, the slit legs 19, 20 and the base 22 can be easily made. They can readily be manufactured by a suitably formed electrode, by an electro erosive process, eroding the intermediate element. The manufacturing tolerance of the erosion process can be comparatively large. The shaft 8, secured to the flange 2 and terminating in end 9, may have any suitable shape, for example polygonal, square, or round; a round shaft is easiest to make and does not require additional machining to provide the cylindrical contour for the thread 14 (FIG. 1).

Various changes and modifications may be made, within the scope of the inventive concept.

I claim:

1. Centering system for rotary machine elements and for coupling a driving portion (2) rotatable about a given axis to a driven portion (9), wherein said driven portion is rotatable about a driven axis,
    said system providing for adjustment between the driving and the driven portion to ensure congruence of said driven axis with said given axis, and having
    a coupling element (8) connecting the driving portion (2) and the driven portion (9);
    wherein the coupling element comprises
    two first spring elements (23, 24) located on one (2) of said portions (2, 9) and coupled to the other (9) of said portion;
    said two first spring elements extending essentially parallel to the axis of rotation of said one portion (2) and being radially deflectable with respect to said axis;
    first counter support means (29) located between said spring elements and coupled to one (20) of said portions; and
    two first adjustable spring position adjustment means (25, 27; 26, 28) coupled to respective ones of said first spring elements (23, 29) and engaging said first counter support means (29) for setting the spring position of the respective first spring elements.

2. The system of claim 1, wherein said portions (2, 9) are adjustably positionable with respect to each other in two planes which included the axes of the driving portion and the driven portion, respectively, and which intersect each other.

3. The system of claim 1, further including two second spring elements (31, 32) located on the other (9) of said portions;
    an intermediate portion (18) coupling said driving and driven portions (9, 18);
    said two second spring elements (31, 32) being rotated about the longitudinal axis of said driving portion (2) by 90 degrees with respect to the first spring elements;
    a second counter support means (33); and,
    two second spring position adjustment means engageable with said second counter support means (33).

4. The system of claim 1, wherein each one of said spring elements (23, 24) is elastically deflectable in a first plane and stiff with respect to deflection in a plane transverse to said first plane.

5. The system of claim 3, wherein each one of said spring elements (23, 24; 31, 32) is elastically deflectable in a first plane and stiff with respect to deflection in a plane transverse to said first plane.

6. The system of claim 3, wherein said two first spring elements (23, 24) and said two second spring elements (31, 32) each form a pair;
    and wherein at least one of the pairs of spring elements includes individual spring elements which are located in parallel planes which, in turn, are parallel to the longitudinal axis of one of said portions.

7. The system of claim 3, wherein the two first spring elements and the two second spring elements, each, form a pair; and
    wherein the first and second counter support means (29, 33) are located between the spring elements of the respective pair.

8. The system of claim 1, wherein said spring position adjustment means comprise screw means (27, 28).

9. The system of claim 3, where in said spring position adjustment means comprise screw means (27, 28, 34).

10. The system of claim 8, wherein the spring elements (23, 24) are formed with threaded bores (25, 26), and said screw means (27, 28) are located in said bores, said bores and hence said screw means being in alignment and on the same level with respect to said given axis.

11. The system of claim 9, where the spring elements (23, 24; 31, 32) are formed with threaded bores (25, 26), and said screw means (27, 28; 34) are located in said bores, said bores and hence said screw means being in alignment and on the same level with respect to said given axis.

12. The system of claim 1, where the spring elements (22, 23) are unitary with said driving portion (2) and said driven portion.

13. The system of claim 3, wherein said spring elements (23, 24, 31, 32) are unitary with said intermediate portion (18) and said driving and driven portions (2, 9).

14. The system of claim 1, wherein the counter support means (29) is unitary with said driven portions (9).

15. The system of claim 3, wherein said counter support elements (29, 31) are unitary with said intermediate portion (18) and said driven portion (9), respectively.

16. The system of claim 1, further including an elongated intermediate portion (8) coupling the driving portion (2) and the driven portion (9);
    a generally U-shaped slit (16) formed in said intermediate portion, to define two respectively parallel legs (19, 21) and a cross or base (22) connecting said legs, said legs (19, 21) extending parallel to the longitudinal axis of the respective portion (2);

the legs (19, 21) and the base portion (22) of the slit intersecting diametrically at opposite side regions of the respective portion, relative to the axis thereof; and wherein the material of the respective portion, separated by said slit from the remainder of the material of said centering system, forms said spring elements.

17. The system of claim 16, wherein the two legs (19, 21) of the slit are arranged symmetrically to the longitudinal axis of the respective portion (2, 9).

18. The system of claim 16, further including a second U-shaped slit (17) formed in said intermediate portion (8), offset circumferentially with respect to the first slit (16) by 90 degrees, said slits being axially spaced to leave an intermediate portion (18) free from said slits; and wherein said slits define base regions (22, 35), axially spaced from each other and extending parallel with respect to each other.

19. The system of claim 16, wherein the legs and the base portion of said slit define straight lines.

20. The system of claim 16, wherein the intermediate portion (18) comprises a cylindrical body.

* * * * *